United States Patent
Schelfaut

(10) Patent No.: US 9,909,441 B2
(45) Date of Patent: Mar. 6, 2018

(54) METHOD OF OPERATING A CLEARANCE CONTROL SYSTEM

(71) Applicant: General Electric Company, Schenectady, NY (US)

(72) Inventor: Timothy Leo Schelfaut, Liberty Township, OH (US)

(73) Assignee: General Electric Company, Schenectady, NY (US)

( * ) Notice: Subject to any disclaimer, the term of this patent is extended or adjusted under 35 U.S.C. 154(b) by 190 days.

(21) Appl. No.: 14/938,200

(22) Filed: Nov. 11, 2015

(65) Prior Publication Data

US 2017/0130602 A1    May 11, 2017

(51) Int. Cl.
| | |
|---|---|
| *F01D 11/24* | (2006.01) |
| *F01D 5/12* | (2006.01) |
| *F01D 5/02* | (2006.01) |
| *F01D 25/24* | (2006.01) |
| *F01D 25/12* | (2006.01) |

(52) U.S. Cl.
CPC .............. *F01D 11/24* (2013.01); *F01D 5/02* (2013.01); *F01D 5/12* (2013.01); *F01D 25/12* (2013.01); *F01D 25/24* (2013.01); *F05D 2220/32* (2013.01); *F05D 2260/20* (2013.01); *F05D 2300/50212* (2013.01)

(58) Field of Classification Search
CPC .......... F01D 11/24; F01D 25/24; F01D 25/12; F01D 5/12; F01D 5/02; F05D 2300/50212; F05D 2220/32; F05D 2260/20
USPC ............................................ 701/100; 60/782
See application file for complete search history.

(56) References Cited

U.S. PATENT DOCUMENTS

| | | | |
|---|---|---|---|
| 4,513,567 A | | 4/1985 | Deveau et al. |
| 4,849,895 A | * | 7/1989 | Kervistin ................ F01D 11/24 415/178 |
| 5,012,420 A | | 4/1991 | Walker et al. |
| 5,090,193 A | | 2/1992 | Schwarz et al. |
| 6,155,038 A | * | 12/2000 | Irwin ....................... F02C 9/28 415/17 |
| 8,973,373 B2 | | 3/2015 | Arar |

* cited by examiner

*Primary Examiner* — Kimberly S Berona
*Assistant Examiner* — Nadeem Odeh
(74) *Attorney, Agent, or Firm* — General Electric Company; Pamela A. Kachur

(57) ABSTRACT

A method of operating a clearance control system for a gas turbine engine, includes estimating, in a control module, thermal expansion values of engine components based at least partially on an exhaust gas temperature of the gas turbine engine, determining an estimated clearance value based on the thermal expansion values and ducting airflow for cooling the engine components.

12 Claims, 6 Drawing Sheets

METHOD OF OPERATING A CLEARANCE CONTROL SYSTEM

BACKGROUND OF THE INVENTION

The present invention relates to a gas turbine engine having an active clearance control system to maintain clearance between rotating blades and seals in a stationary casing of the gas turbine engine.

In a gas turbine engine, hot combustion gases flow through an annular gas passage between a rotor and a casing of the turbine engine. Rotating blades, e.g., buckets, extend radially from the rotor and into the annular gas passage. The hot combustion gases flowing over the blades rotate the turbine and thereby drive the gas turbine.

There is a gap between the tips of the rotating blades and seals the casing. Because the gap is small, there is a risk that the tips of the blades can impact, or rub against the seals. This risk of rubbing is increased as the gas turbine engine heats during startup and rapid throttle movements, and cools during rapid decelerations and shutdown. The thermal expansion rates of the casing and seals tend to be different than the thermal expansion rates of the turbine rotor and the blades. These differences may cause variations in the clearance between the tips of the blades and the seals. For example thermal expansion of the rotor and blades may cause the blade tips to approach the casing, before the casing expands to accommodate the changes. If the clearance were to become too small, the blade tips can impact or rub against the seals of the casing.

BRIEF DESCRIPTION OF THE INVENTION

In one aspect, a method of operating a clearance control system for a gas turbine engine includes estimating, in a control module, a first thermal expansion value of a set of low pressure turbine blades in the gas turbine engine based at least partially on an exhaust gas temperature of the gas turbine engine and a first thermal expansion lag factor of the set of low pressure turbine blades, estimating, in the control module, a second thermal expansion value of a casing concentric to the set of low pressure turbine blades based at least partially on the exhaust gas temperature of the gas turbine engine and a second thermal expansion lag factor of the casing, determining, in the control module, an estimated clearance value based on the first and second thermal expansion values, determining, in the control module, a first airflow value for cooling the casing based on a comparison of the estimated clearance value with a target clearance value, determining, in the control module, a second airflow value for cooling the casing based on a comparison of the thermal expansion value of the casing with a casing limit value, and ducting airflow for cooling the casing according to the greater of the first airflow value or the second airflow value.

In another aspect, a method of operating a clearance control system for a gas turbine engine includes estimating, in a control module, a thermal expansion value of a casing concentric to a set of low pressure turbine blades in the gas turbine engine based at least partially on the exhaust gas temperature of the gas turbine engine and a thermal expansion lag factor of the casing, determining, in the control module, an airflow value for cooling the casing based on a comparison of the thermal expansion value of the casing with a casing limit value, and ducting airflow for cooling the casing according to the airflow value.

In yet another aspect, a method of operating a clearance control system for a gas turbine engine includes, in a control module, estimating a clearance profile between a set of low pressure turbine blades in the gas turbine engine and a casing concentric to the set of low pressure turbine blades, while simultaneously estimating a thermal expansion profile of the casing, determining, in the control module, a first airflow profile for cooling the casing based on a comparison of the estimated clearance with a target clearance profile, determining, in the control module, a second airflow profile for cooling the casing based on a comparison of the estimated thermal expansion profile of the casing and a predetermined thermal expansion profile limit of the casing, selecting, in the control module, at least one of the first or the second airflow profiles based on which of the at least first or second airflow profiles results in greater cooling of the casing, and controlling an airflow for cooling the casing according to the selected at least one of the first or second airflow profiles.

DESCRIPTION OF EMBODIMENTS OF THE INVENTION

Figure 1:
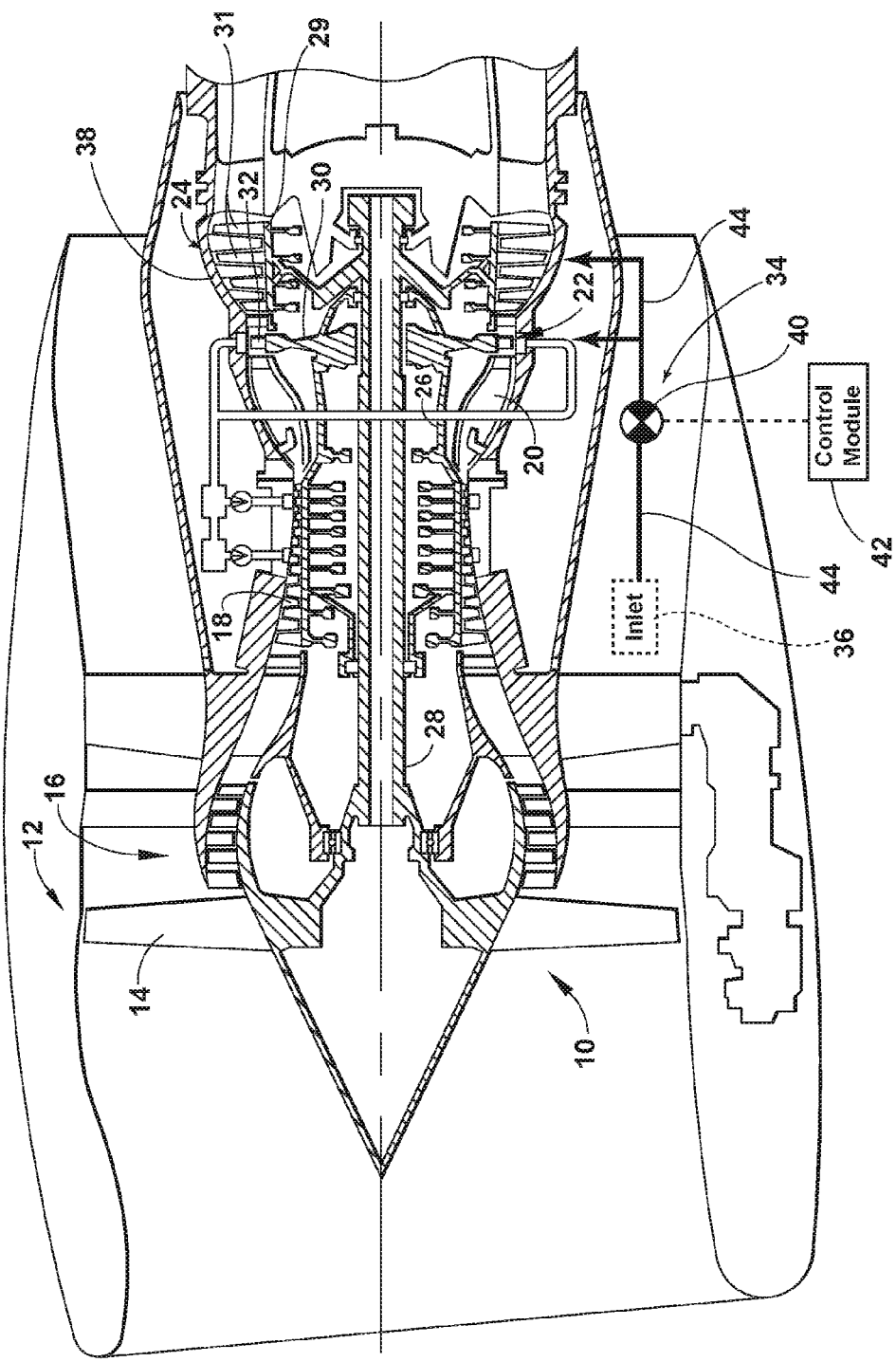
FIG. 1 illustrates a cross-sectional view of a gas turbine engine having a clearance control system in accordance with various aspects described herein.

FIG. 1 is a schematic cross-sectional diagram of a gas turbine engine 10 for an aircraft. The engine 10 includes, in downstream serial flow relationship, a fan section 12 including a fan 14, a booster or low pressure (LP) compressor 16, a high pressure (HP) compressor 18, a combustion section 20, a HP turbine 22, and a LP turbine 24. A HP shaft or spool 26 drivingly connects HP turbine 22 to HP compressor 18 and a LP shaft or spool 28 drivingly connects LP turbine 24 to LP compressor 16 and fan 14. The LP turbine 24 includes an LP turbine rotor 29 having turbine blades 31 mounted at the periphery of the rotor 29. Similarly, the HP turbine 22 includes an HP turbine rotor 30 having turbine blades 32 mounted at a periphery of rotor 30. The turbine blades 31, 32 extend radially outwardly from the respective rotors 29, 30 to radially outer blade tips.

During engine 10 operation, at least a portion of ambient air enters the fan section 12, and is compressed by the LP compressor 16, driven by the LP spool 28. The compressed air is delivered downstream and further compressed by the HP compressor 18, driven by the HP spool 26. The further compressed air is mixed with fuel and combusted in the combustor section 20, and the hot, pressurized combustion gases are channeled yet further downstream through the HP turbine 22 and the LP turbine 24, which in turn, provide the driving forces to rotate the upstream driving spools 26, 28. As the hot, pressurized combustion gases are channeled or flow downstream through the HP turbine 22 and the LP turbine 24, heat is transferred from the combustion gases to the turbines 22, 24 and surrounding components, such as a casing 38 concentric to the turbines 22, 24. The transfer of heat to the turbines 22, 24 and casing 38 can, in turn, cause thermal expansion of the turbines 22, 24 and the casing 38.

The engine 10 can also include an active clearance control system 34, including, for example, an air inlet 36, a controllable valve 40, a control module 42, and ducting 44. The ducting 44 can fluidly couple the air inlet 36 with the valve 40, and can further fluidly couple the valve 40 with at least one of the turbines 22, 24. The control module 42 can be communicatively coupled with the controllable valve 40 as to control the operation of the valve 40, such as providing a variable fluid path between the air inlet 36 to the at least one turbine 22, 24. In this sense, the active clearance control system can operate to regulate, control, adjust, or modify an airflow traversing the air inlet 36, ducting 44, and controllable valve. The airflow can be utilized to cool the casing 38 for the turbines 22, 24 to ensure that the thermal expansion of the turbines 22, 24, blades 31, 32, casing 38, or a combination thereof, does not result in the tips of the rotating blades 31, 32 rubbing or contacting against the casing 38 of the turbines 22, 24. Alternatively, embodiments of the disclosure can be included wherein an expected or predetermined amount of rubbing or contacting between the tips of the rotating blades 31, 32 and the casing 38 of the turbines 22, 24 can be tolerated or accepted so long as the rubbing or contacting is below a contacting threshold. In this alternative embodiment, the airflow can be utilized to cool the casing 38 for the turbines 22, 24 to ensure that the thermal expansion of the turbines 22, 24, blades 31, 32, casing 38, or a combination thereof, does not result in rubbing or contacting above the contacting threshold.

While embodiments of the active clearance control system 34 can include providing air utilized to cool the aforementioned components 22, 24, 31, 32, 38, embodiments of the disclosure can include alternative airflow configurations, or can include a heat exchanger to warm air passing through the active clearance control system 34. In this sense, the active clearance control system 34 can operate to regulate, control, adjust, or modify an airflow to heat or cool air to ensure that the thermal expansion of the turbines 22, 24, blades 31, 32, casing 38, or a combination thereof, does not result in the tips of the rotating blades 31, 32 rubbing or contacting against the casing 38 of the turbines 22, 24. As explained above, if embodiments of the disclosure can tolerate or accept a contacting threshold, the active clearance control system 34 can operate to regulate, control, adjust, or modify an airflow to heat or cool air to ensure the contacting threshold is not exceeded.

Figure 2:
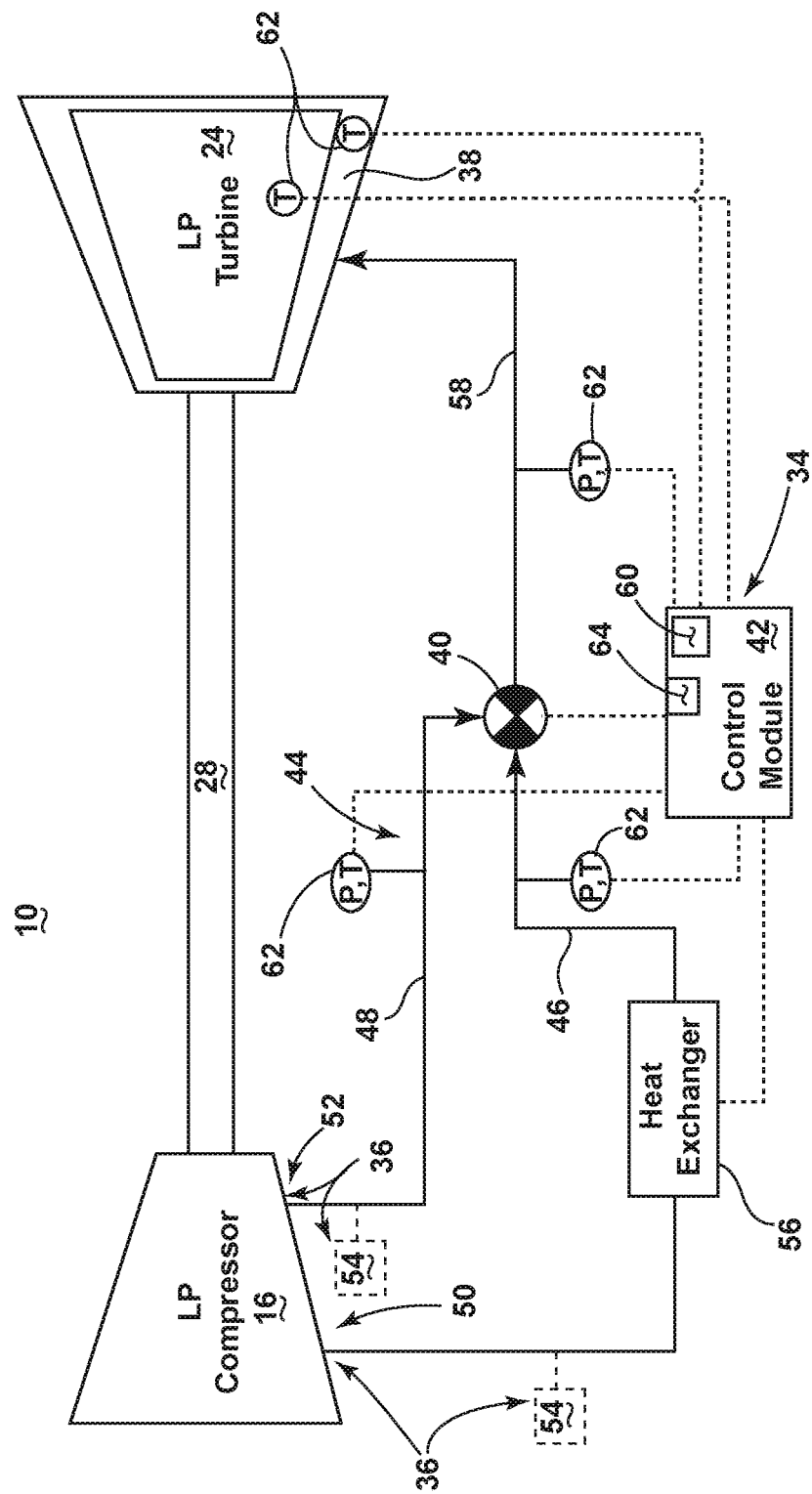
FIG. 2 illustrates an example schematic view of the engine and clearance control system of FIG. 1, in accordance with various aspects described herein.

FIG. 2 is a schematic view of the LP compressor 16, LP turbine 24, LP spool 28, and active clearance control system of the engine 10 of FIG. 1. Only the LP portions 16, 24, 28 of the engine 10 are illustrated for brevity, however embodiments of the disclosure can be equally applicable to the HP portions 18, 22, 26, or to both the LP and HP portions. The ducting 44 upstream from the controllable valve 40 can include a set of gas passages, shown as a first gas passage 46 and a second gas passage 48, which can, for example, extract compressed air from a set of stages of the LP compressor 16, illustrated as a respective first stage 50 and a second stage 52. In this sense, the LP compressor 16 can include an axial compressor with successive compression stages. The first compressor stage 50 can provide air more compressed, less compressed, or equally compressed, compared with the second compressor stage 52. Alternatively, the ducting 44 or set of gas passages 46, 48 upstream from the controllable valve 40 can receive compressed or uncompressed air, including, but not limited to, air received by an air input housing 54, such as ram air. In this sense, the air inlet 36 can include, but is not limited to, receiving air from a set of compressor stages 50, 52, air input housings 54, fan air, booster air, air directly from the aircraft wing, air from the engine inlet, or a combination thereof.

In embodiments wherein the set of gas passages 46, 48 extract compressed air from the set of compressor stages 50, 52 one stage, a gas passage, such as the second gas passage 48, can extract hot, highly compressed air being discharged from, for example, the last stage of the compressor, such as the second compressor stage 52. Another gas passage, such as the first gas passage 46, can extract warmed, less compressed air, or cool air, from an upstream stage of the compressor, such as the middle compressor stage or a stage between the inlet to the compressor and the middle compressor stage (illustrated as the first compressor stage 50). The extracted warmed, less compressed air flowing through the first gas passage 46 can include a lower pressure and temperature than is the hot, highly compressed air flowing through the second gas passage 48.

The set of passages 46, 48 used or utilized by the clearance control system 34 to extract compressed air and the stages 50, 52 or locations on the compressor 16, can be selected based on the design of the clearance control system 34. For example, an LP compressor 16 can include a set of, for example, six compressor stages, wherein the stages have varying temperature and compressed air characteristics. A subset of the stages can be selected based on the design of the active clearance control system 34, or the desired cooling of the LP turbine 24 or casing 38.

Additionally, the gas passages 46, 48 can include optional heat exchangers 56, illustrated in line with the gas passage 46 coupling the first compressor stage 50 with the controllable valve 40. The heat exchangers 56 can also be communicatively coupled with the control module 42. Only one optional heat exchanger 56 is illustrated, however embodiments of the disclosure can include a heat exchanger 56 corresponding to each in the set of gas passages 44, 46 or a common heat exchanger 56 for the ducting 44. The optional heat exchangers 56 can, for example, adjust or modify (e.g. heat or cool) the temperature of the compressed air flowing through one or more the set of gas passages 44, 46, as needed. For example, an optional heat exchanger 56 for hot, highly compressed air can be used to cool the compressed gas temperature to a desired temperature suitable for heating or cooling the casing 38 of the LP turbine 24. Additionally or alternatively, a portion of hot exhaust gas from the LP compressor 16 can be ducted to flow through the heat exchanger 56, and used as a source of heat energy to heat cool or warm compressed gas flowing through the heat exchanger 56, such as from the first compressor stage 50. The control module 42 can be configured to control the heat exchanger 56 to adjust the flow of the heating/cooling fluid and thereby adjust the temperature change of the compressed gas flowing from the LP compressor 16 and through the heat exchanger 56.

The controllable valve 40 of the clearance control system 34 can controllably direct the compressed air received at the air inlet 36 to the turbine casing through a third gas passage 58 downstream from the valve 40. The valve 40 can include a one way or two-way control valve that is, for example, mounted directly to the casing 38 of the LP turbine 24 or positioned in close proximity to the turbine 24. The valve 40 can further include a single valve or a set of valves, and can be configured to individually select, control, or regulate the amount or flow rate of air received by the upstream ducting 44 to the downstream third gas passage 58. For example, the valve 40 can be controlled to allow only compressed air from one of the first or second gas passages 46, 48 to pass through the valve 40 and to the casing 38 of the LP turbine 24. The control module 42 can be configured to select which passage 46, 48, or a ratio of the set of passages 46, 48, to provide the air for the casing by, for example, determining a target temperature value for the casing 38 and selecting the passage 46, 48 having the closest airflow temperature, or ratio of airflow through the set of passages 46, 48, to affect the heating or cooling of the casing 38 to the target temperature value.

The active clearance control system 34 can further include a set of sensors 62, such as temperature sensors, pressure sensors, or a combination thereof, to provide a temperature or pressure output indicative of the respective temperature or pressure of a particular engine 10 component. For example, a number of temperature sensors 62 can be located at or in the first, second, or third gas passages 46, 48, 58, at the casing 38, or within the LP turbine 24, and can provide a temperature output indicative of the temperature of the respective component 46, 48, 58, 38, 24. Likewise, a subset of the sensors 62 located at or in the first, second, or third gas passages 46, 48, 58 can further include a pressure sensor 62 and can provide a pressure output indicative of the pressures in the respective ducting 44. In one example, a temperature sensors 62 can operate to measure or sense the temperature of the exhaust gases vented by the LP turbine 24. Each of the sensors can be communicatively coupled with the control module 42 to provide the respective temperature or pressure output to the module 42.

The example placement of the set of sensors 62 is merely one non-limiting example of an embodiment of the disclosure, and alternative embodiments having additional or fewer sensors 62 can be included. Additionally, embodiments of the disclosure can include examples wherein a temperature or pressures is not measured directly, but a temperature or pressure output can be indirectly estimated, calculated, or inferred. For example, in one non-limiting embodiment of the disclosure, the casing 38 can lack a temperature sensor, but the temperature of the casing 38 can be estimated by way of the temperature of the exhaust gases of the turbine 24, or by way of the turbine sensor 62.

By way of another non-limiting example, the control module 42 can include a processor 60 configured to compute, calculate, or make determinations regarding conditions of the engine 10, such as the temperature of the casing 38 or the temperature of the gases traversing the ducting 44. In this sense, the control module 42 or processor 60 can be configured to monitor the set of temperature or pressure outputs, and can, for example, repeatedly calculate or estimate a thermal expansion value related to at least one of the LP turbine 24 or the casing 38.

The controller module 42 can further include memory 64 in which is stored operational data related to or utilized to make determinations regarding the conditions of the engine 10. The memory 64 can include random access memory (RAM), read-only memory (ROM), flash memory, or one or more different types of portable electronic memory, such as discs, DVDs, CD-ROMs, etc., or any suitable combination of these types of memory. The controller module 42 can be operably coupled with the memory 64 such that one of the controller module 42 and the memory 64 can include all or a portion of a computer program having an executable instruction set for controlling the active clearance control system 34, operation of the controllable valve 40, or operation of the optional heat exchangers 56. The program can include a computer program product that can include machine-readable media for carrying or having machine-executable instructions or data structures stored thereon. Such machine-readable media can be any available media, which can be accessed by a general purpose or special purpose computer or other machine with a processor.

Generally, such a computer program can include routines, programs, objects, components, data structures, algorithms, etc., that have the technical effect of performing particular tasks or implement particular abstract data types. Machine-executable instructions, associated data structures, and programs represent examples of program code for executing the exchange of information as disclosed herein. Machine-executable instructions can include, for example, instructions and data, which cause a general purpose computer, special purpose computer, controller module 42, or special purpose processing machine to perform a certain function or group of functions. As explained above, in implementation, the temperature or pressure output can be converted to an algorithm, which can be converted to a computer program comprising a set of executable instructions, which can be executed by the processor 60.

Figure 3:
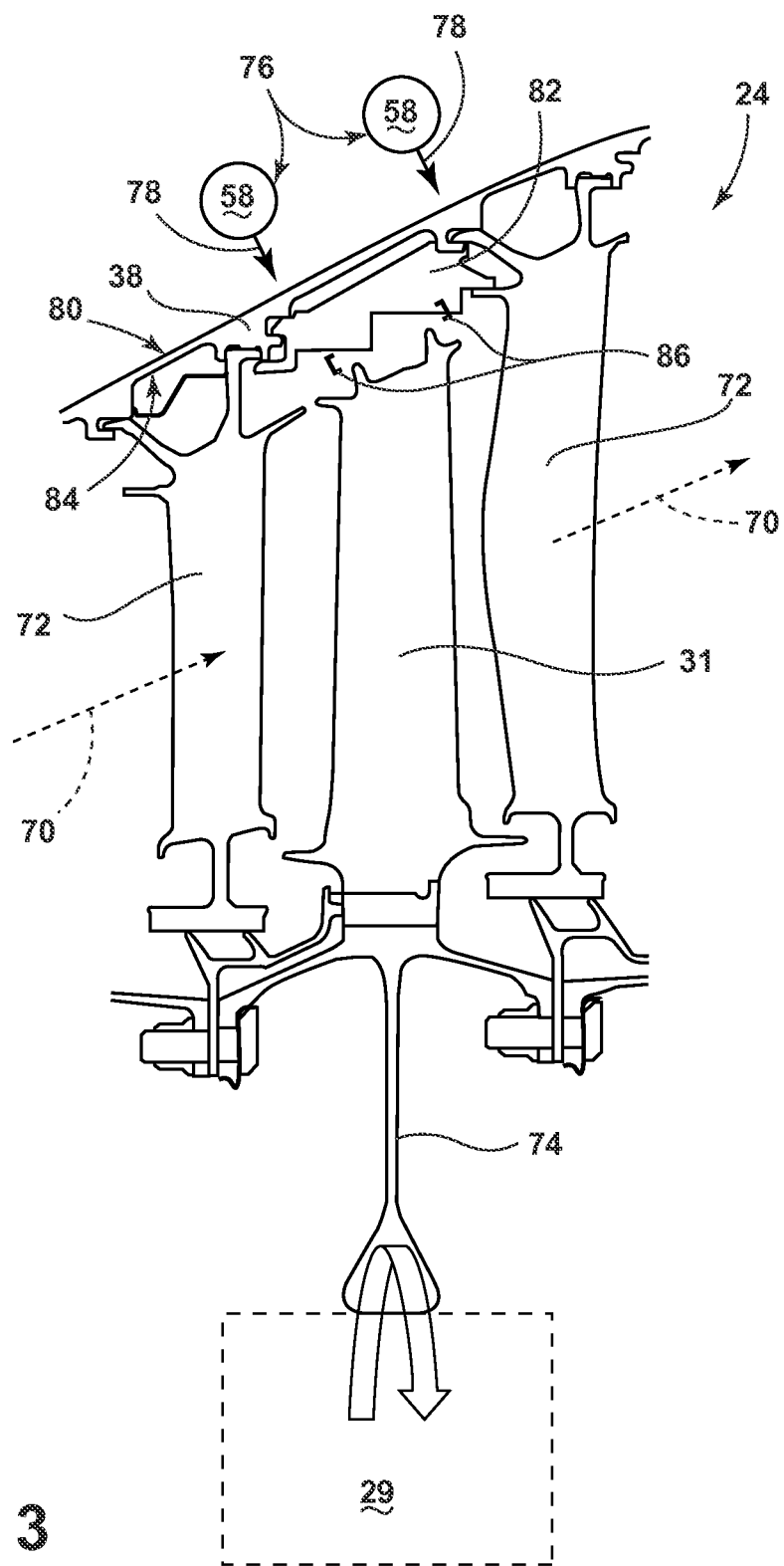
FIG. 3 is a cross-sectional view of a low pressure turbine of the engine of FIG. 1, in accordance with various aspects described herein.

FIG. 3 illustrates a cross-sectional view of a portion of the LP turbine 24 during operation of the engine 10. As shown, a set of rotatable LP turbine blades 31 are alternated located along a fluid pathway with a set of stationary blades or vanes 72 fixedly coupled with the casing 38. The LP turbine blades 31 can be fixedly coupled with the LP rotor 29 by way of an intermediate structure, such as a disc 74. As hot combusted exhaust gas 70 is vented through the fluid pathway of the turbine 24, the airflow drives or rotates the LP turbine blades 31 about the LP rotor 29, relative to the casing 38 and the set of stationary vanes 72.

A set of annular shrouds 82 or annular seals are arranged around an inner surface 84 of the casing 38 to correspond with the radial tips of each the LP turbine blades 31. The shrouds 82 are sized and shaped to prevent hot exhaust gases 70 from flowing radially outward of the tips of the LP turbine blades 31. Stated another way, the shrouds 82 are sized and shaped relative to the blades 31 to keep a significant portion of the exhaust gases 70 moving through the fluid pathway of the alternating blades 31 and vanes 72.

The rotational clearance between the radial tip of the blade 31 and the shroud 82 defines an annular gap 86. The annular gap 86 tends to be small to minimize leakage of exhaust gases 70, as explained above, while maintaining sufficient clearance between the blade 31 and the casing 38 or shroud 82 to avoid rotational rubbing or contact between the components 31, 38, 84, or ensure the contacting threshold is not exceeded, as explained above.

A set of nozzles 76 are also illustrated, and are fluidly coupled with the third gas passage 58. The set of nozzles 76 can operate to spray, direct, or provide the airflow (illustrated by arrows 78) traversing the third gas passage 58 to an outer surface 80 of the casing 38. While two nozzles 76 are illustrated, embodiments of the disclosure can include configurations wherein a set of nozzles 76 extends along a partial or full length of the casing.

Figure 4:
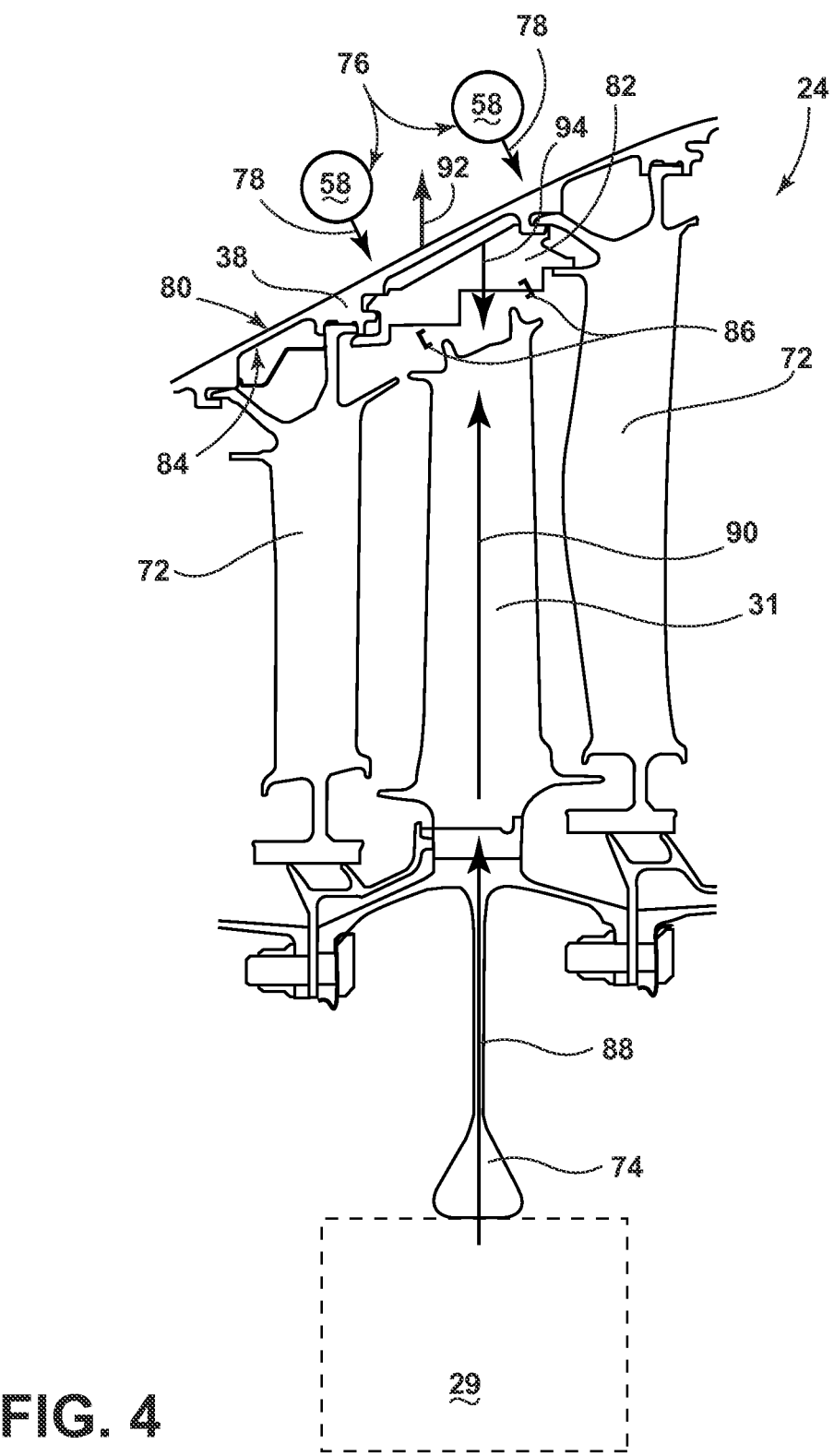
FIG. 4 illustrates the thermal expansion in the low pressure turbine of FIG. 3, in accordance with various aspects described herein.

Turning now to FIG. 4, while the engine 10 operates, exposure of the hot exhaust gases 70 to the components in the LP turbine 24 can cause or effect a thermal expansion or deflection of the components. As shown, the disc 74 can experience a first thermal expansion or deflection radially outwardly (illustrated by arrow 88), the blade 31 can experience a second thermal expansion or deflection radially outwardly (illustrated by arrow 90), or a combination of both the first and second thermal expansions 88, 90 can be experienced. The first or second thermal expansions 88, 90 can further cause or effect the clearance of the annular gap 86 between the blade 31 and the casing 38 or shroud 82. For example, if left unaccounted for, the thermal expansions 88, 90 of the disc 74 and blade 31 could eliminate or close the gap 86, causing rubbing, contact, or more rub than targeted, as explained above. Additional component thermal expansions can be included in embodiments of the disclosure, wherein the expansion effects, causes, or results in a variance of the annular gap 86 during engine 10 operation.

The blade 31 or disc 74 can further experience a first mechanical deflection, expansion, or growth due to the centrifugal or pressure loads on the respective blade 31 or disc 74, during rotation in the engine 10. Additionally, the casing 38 or shroud 82 can similarly experience a second mechanical deflection, expansion, or growth due to the pressure loads of the operating engine 10. These first and second mechanical deflections can further cause or effect the clearance of the annular gap 86 between the blade 31 and the casing 38 or shroud 82.

To counteract the thermal expansions 88, 90 during operations to prevent rotational contact, or to ensure the contacting threshold is not exceeded, while maintaining a small clearance to minimize leakage of exhaust gases 70 as explained herein, the active clearance control system 34 can operate to deliver, provide, spray, or blow the airflow 78 onto or at the outer surface 80 of the casing 38 to effect a thermal expansion (illustrated by first arrow 92) or a thermal contraction (illustrated by second arrow 94) of the casing 38 relative to the rotatable blades 31. For example, during engine 10 operation, heated or cooled airflow 78 can be supplied to the casing 38 for circulation on the outer surface 80, or through various passages of the casing 38 to radially expand or contract the casing 38 or shroud 82, and hence displace the shroud 82 radially further outwardly or inwardly from the radial tips of the blades 31. The airflow 78 flowing through the ducting 44 for the active clearance control system can be exhausted from the turbine 24 into the exhaust gas stream of the engine 10.

The active clearance control system 34 or control module 42 can further be configured to adjust the gap 86 to match or substantially attain a target clearance value, range, or profile during engine 10 operation. For example, the active clearance control system 34 can operate the controllable valve 40 to direct a selected mixture of airflow 78 through the third gas passage 58 at a target temperature, such that the airflow 78 heats, cools, or maintains a target temperature of the casing 38 or shroud 82. In this sense, the target temperature of the casing 38 or shroud 82 can be related to the target clearance value, range, or profile based on a predetermined, estimated, or calculated thermal expansions 88, 90 of the blade 31 or disc 74. The target clearance value can additionally include a value, range, or profile representative of a clearance closure value, or an amount of gap 86 to be reduced. For example, a target clearance value could include a gap of 10 millimeters, or a clearance closure value of 90 millimeters, that is, control the clearance to remove 90 millimeters from the current gap 86.

Figure 5:
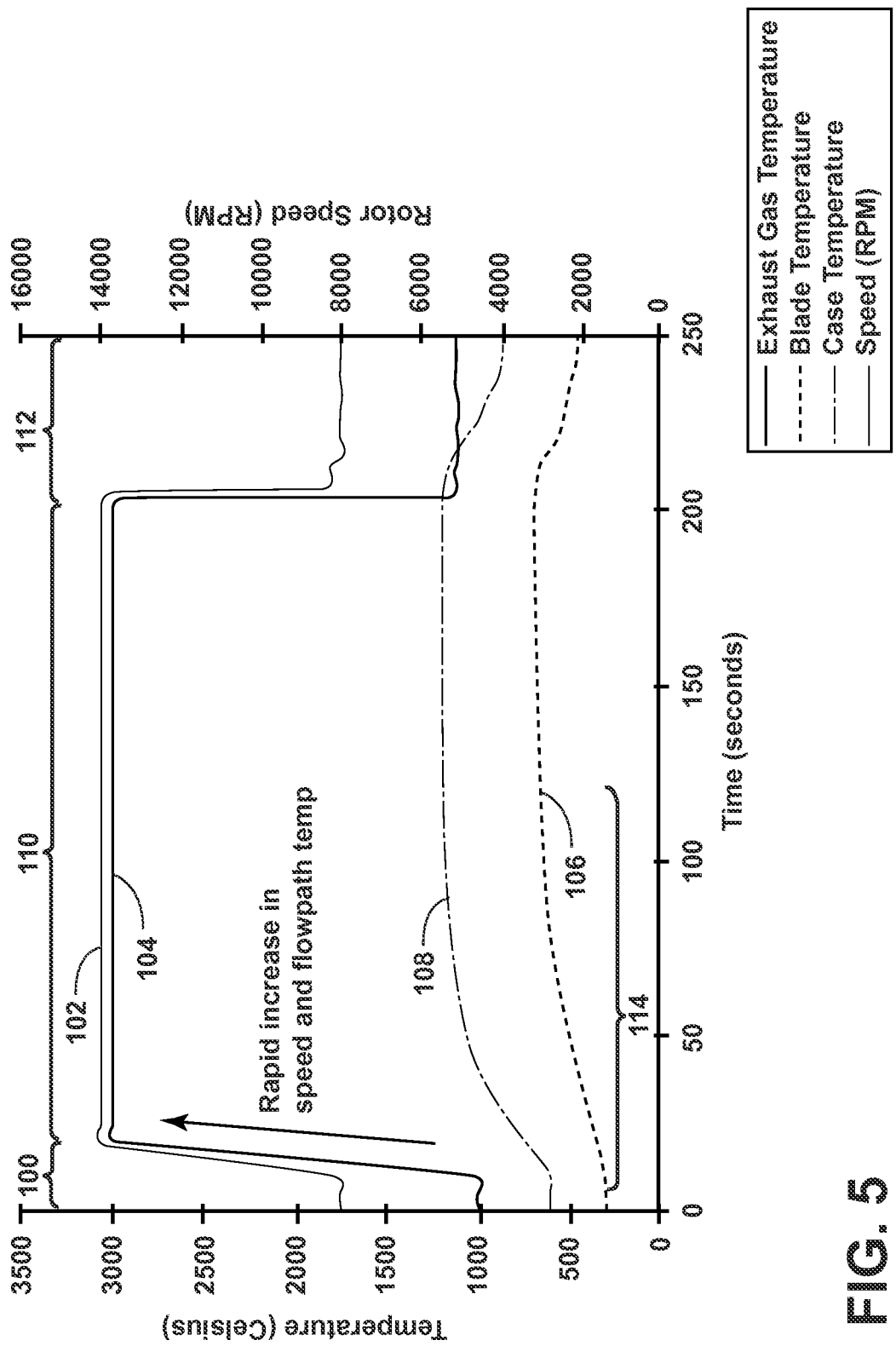
FIG. 5 is a set of example plots illustrating exemplary temperatures and speeds of the low pressure turbine of FIG. 3 during engine operation, in accordance with various aspects described herein.

The target clearance value, range, or profile can take into account a predetermined, estimated, expected, or determined thermal expansions or mechanical deflections of the disc 74, blade 31, shroud 82, or casing 38 over varying periods of different engine 10 operations, as illustrated in FIG. 5. For example, the active clearance control system 34 can operate to reach, match, or substantially attain a first target clearance profile during a start-up phase 100 of the gas turbine engine 10. During this phase 100, the engine 10 rapidly increases the rotational speed of the engine 10 (shown as a first graph 102) of the rotating sections, which in turn generates a rapid increase in the exhaust gas temperature (shown as a second graph 104) flowing between the blades 31 and the casing 38. The rapid increase in temperature of the exhaust gases 104 effects or causes an increase in the temperature of the blade 31 (shown as a third graph 106) and an increase in the temperature of the casing 38 (shown as a fourth graph 108).

In another example, the active clearance control system 34 can operate to reach, match, or substantially attain a second target clearance profile during a steady state phase 110, wherein the rotational speed 102 and the exhaust gas temperature 104 is held constant throughout the phase 110. In yet another example, the active clearance control system 34 can operate to reach, match, or substantially attain a third target clearance profile during a cool down phase 112, wherein the rotational speed 102 of the engine 10 is reduced, and the exhaust gas temperature 104 is correspondingly reduced as well.

During these different phases 100, 110, 112 of engine 10 operation, the blade temperature 106 and the casing temperature 108 increase and decrease at a rate trailing the exhaust gas temperature 104 increases and decreases. This is because the heating or cooling of the blades 31 and casing 38, and the resulting thermal expansion of the blades 31 and casing 38, occurs over a period of time rather than immediately. This period of delay between the initial increase of the exhaust temperature 104 and the leveling-off of the blade and case temperatures 106, 108 can be considered a thermal lag factor 114. In this sense, the blades 31 can have a first thermal lag factor, and the casing 38 can have a second thermal lag factor, wherein the first and second lag factors are different values or time ranges.

The aforementioned lag factors can further be related to a respective first thermal expansion lag factor for the blades 31 and a second thermal expansion lag factor for the casing 38, wherein the first and second thermal expansion lag factors are different values or time ranges. While a thermal lag factor 114 is not illustrated between the steady state phase 110 and the cool down phase 112, embodiments of the disclosure envision a lag factor and corresponding thermal lag factor can likewise be included, wherein the lag factor accounts for the delay in cooling the blades 31 and casing 38 after the reduction in exhaust gas temperature 104.

Thus, embodiments of the disclosure can include an active clearance control system 34 that accounts for or adjusts operations of heating or cooling the casing 38 and like components such that the target temperature profile or the target clearance profile includes the thermal expansion lag factor due to trailing heating or cooling of the components relative to the exhaust gases. The graphs provided are intended to illustrate one non-limiting example of the rotational speed 102, exhaust gas temperature 104, blade temperature 106, and case temperature 108, as described, and do not specifically represent any necessary values, temperatures, or operations of the engine 10 or active clearance control system 34 method. The variations in these graphs 102, 104, 106, 108 can include or vary due to the amount of compressor air extracted, the compressor stages selected, the amount of heat energy added or extracted from the extracted compressor air, and the temperature of the extracted compressor air as it flows into the turbine casing.

Figure 6:
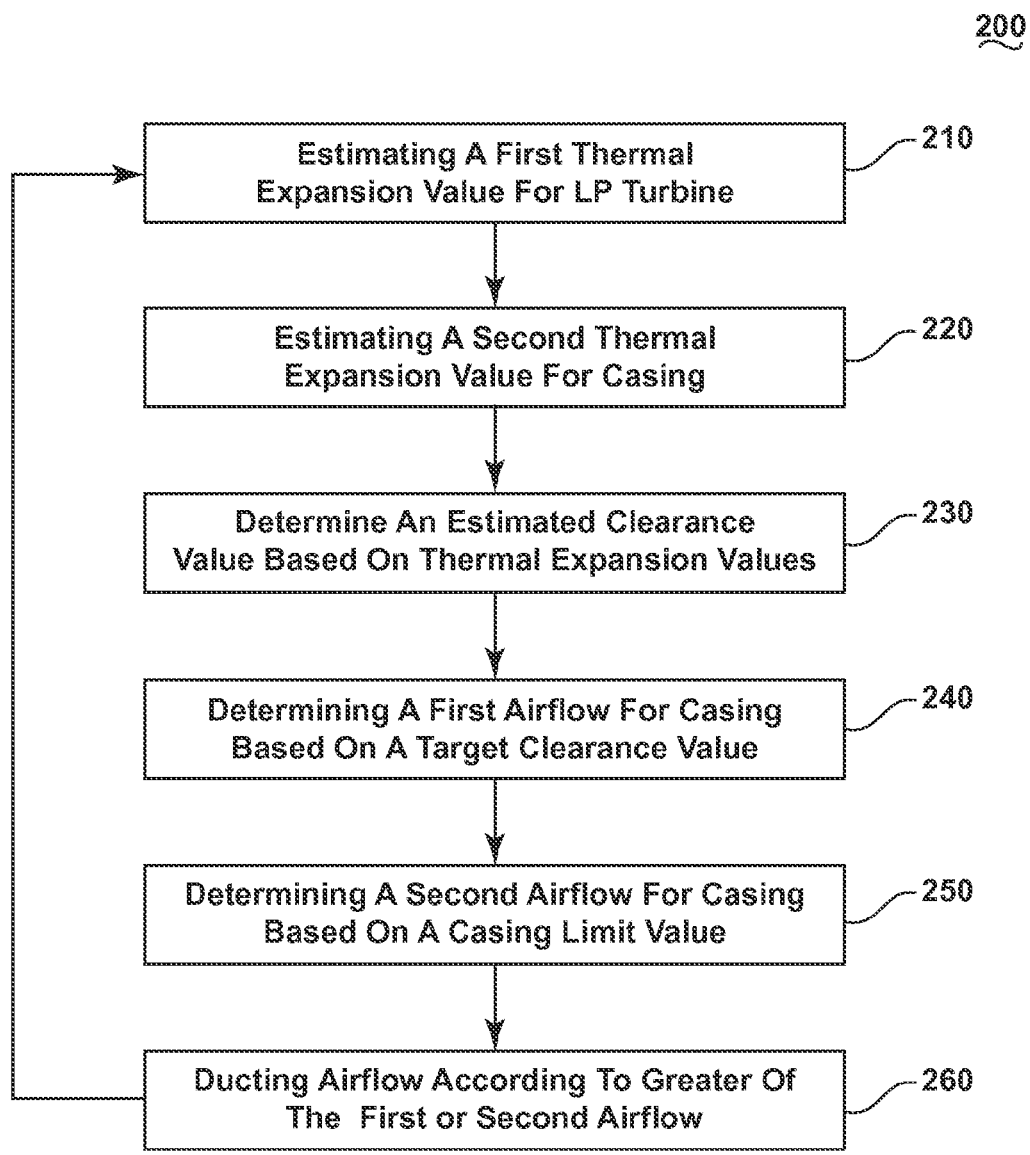
FIG. 6 is an example a flow chart diagram of demonstrating a method of operating the clearance control system in accordance with various aspects described herein.

In accordance with an example embodiment of the disclosure, FIG. 6 illustrates a method 200 for operating a clearance control system for a gas turbine engine 10. The method 200 includes a first estimating 210, in the control module 42, of a first thermal expansion value of a set of LP turbine blades 31 based at least partially on an exhaust gas temperature 104 of the engine 10 or the current temperature of the blades 31. The first estimating step 210 for the thermal expansion value of the set of LP turbine blades 31 can be based at least partially on the exhaust gas temperature 104 of the engine 10 and the first thermal expansion lag factor of the LP turbine blades 31. The exhaust gas temperature 104 can be sensed, measured, or estimated using the control module 42, one or more sensors 62, or a predetermined profile, as described herein. While only LP turbine blades 31 are described in the first estimating step 210, embodiments of the disclosure can include estimating, including accounting for a thermal expansion lag factor, of any LP turbine 24 components, including but not limited to, the disc 74 or rotor 29.

Next, the method 200 includes a second estimating 220, in the control module 42, of a second thermal expansion value of the casing 38 concentric to the set of LP turbine blades 31. The second estimating step 220 for the thermal expansion value of the casing 38 can be based at least partially on the exhaust gas temperature of the engine 10, the current temperature of the casing 38, or a second thermal expansion lag factor of the casing 38. Similar to the first estimating step 210, the exhaust gas temperature 104 can be sensed, measured, or estimated using the control module 42, one or more sensors 62, or a predetermined profile, as described herein. Additionally, while only the casing 38 is described in the second estimating step 220, embodiments of the disclosure can include estimating, including accounting for a thermal expansion lag factor, of any casing 38 components, including but not limited to, the shroud 82.

The method 200 can further include a first determining step 230, wherein the control module 42 can estimate a clearance value between the casing 38 and the blades 31 based at least in part on the first and second estimated thermal expansion values. The method 200 can additionally include a second determining step 240, wherein the control module 42 can determine a first airflow value configured for cooling the casing 38 based on a comparison of the estimated clearance value between the casing 38 and the blades 31 with a target clearance value between the casing 38 and the blades 31. The second determining step 240 can include determining controllable characteristics for the first airflow value, including, but not limited to, airflow temperature, flow rate, and the like. The control module 42 can further estimate or determine instructions or control signals generated to operate, for example, the heat exchanger 56 or the controllable valve 40 to attain or achieve the characteristics for the first airflow value.

The method 200 can also include a third determining step 250, wherein the control module 42 can determine a second airflow value for cooling the casing 38 based on a comparison of the thermal expansion value of the casing 38 with a casing limit value, such as a maximum thermal expansion value related to the casing 38, or casing 38 material capabilities, a casing 38 material thermal capabilities value, a casing 38 thermal cracking value, a casing 38 thermal deformation value, a casing 38 thermal deflection value, a casing 38 thermal failure value, or any other thermally dependent material property value of the casing 38. The casing limit value can include a thermal expansion profile for the casing 38 defining physical limitations of casing 38, including, but not limited to, a maximum rate of casing 38 thermal expansion, maximum deflection of the casing 38, or a maximum rate of casing 38 thermal expansion over a period of time. The casing limit value can be further related to a maximum thermal expansion value known to or estimated to cause damage to the casing 38. Damage can include, but is not limited to, warping, cracking, breaking, rupture, or failure to at least a portion of the casing 38 or shroud 82. In this sense, the third determining step 250 is configured to estimate a second airflow value for cooling the casing 38 to prevent damage from occurring in the casing 38 due to rapid thermal expansion.

As with the second determining step 240, the third determining step 250 can include determining controllable characteristics for the second airflow value, including, but not limited to, airflow temperature, flow rate, and the like. The control module 42 can further estimate or determine instructions or control signals generated to operate, for example, the heat exchanger 56 or the controllable valve 40 to attain or achieve the characteristics for the second airflow value.

Additionally, the method 200 can include a ducting step 260, wherein the control module 42 is configured to operate or control the active clearance control system 34 to duct the airflow for cooling the casing 38 according to the greater of the first airflow value from the second determining step 240 or the second airflow value from the third determining step 250. As used herein, the "greater" of the first or second airflow values is used to denote the airflow value that generates, results in, or produces the greatest cooling for the casing 38. For example, for determinations for a first airflow for heating the casing 38 and a second airflow for heating the casing 38, the airflow with the least amount of heating (e.g. resulting in a cooler casing 38) will be selected. The control module 42 can thus operate, for example, the heat exchanger 56 or the controllable valve 40 to attain or achieve the characteristics for the selected first or second airflow value. The control module 42 or the active clearance control system 34 can additionally monitor a number of the sensors 62 in the ducting 44 in determining the instructions or control signals generated to operate the active clearance control system 34, and can further monitor a number of sensors 62 downstream from the controllable valve 40 to ensure, verify, or validate the actual airflow characteristics match the selected first or second airflow characteristics.

Embodiments of the disclosure can further operate the method to include optional steps of estimating, in the control module 42, the first mechanical deflection value of the blade 31 or disc 74 due to, for example, centrifugal forces or pressure loading of the engine 10. Additional optional steps can include estimating, in the control module 42 a second mechanical deflection value of the casing 38 or shroud 82 due to, for example, pressure loads in the engine 10. In this alternative embodiment of the method 200, the first determining step 230, can further include the control module 42 estimating a clearance value between the casing 38 or shroud 82 and the blades 31 based at least in part on the first and second estimated thermal expansion values and the first or second mechanical deflection values. The method 200 can further repeat the aforementioned steps to form a continuing method for operating the clearance control system 34 for the engine 10.

During example operating embodiments of the active clearance control system 34, the casing 38 can be heated by the system 34 faster than the set of blades 31 and the vanes 72 can be heated by the exhaust gases 104. In this example, such as during the start-up phase, the active clearance control system 34 thermally expands the casing 38 at least as fast as, or faster than the thermal expansion of the blades 31 and vanes 72, and thereby ensures the gap 86 provides sufficient or adequate clearance between the shrouds 82 and the blade 31 tips. During steady state operation 110 of the engine 10, the airflow supplied to the casing 38 can be adjusted to contract or expand the casing 38 relative to the blades 31 to adjust the gap 86 and thereby achieve a minimum clearance between the shrouds 82 and blade 31 tips to increase the efficiency of the engine 10 operation. During the engine 10 cool down phase 112, the rate of thermal contraction of the casing 38 can be controlled to be less than the rate of contraction of the blades 31.

Additional configurations or comparisons can ensure the active clearance control system 34 operates to ensure proper clearance between the casing 38 and the blades 31 while ensuring the casing 38 does not approach, reach, or exceed the casing limit value or range. For example, embodiments of the disclosure can include a method that only operates the second estimating step 220 for the casing 38, the third determining step 250 for the casing 38, and the ducting step 260, as described above. In another example embodiment of the disclosure, the estimating steps 210 and 220 can occur simultaneously. Additionally, while the illustrated and described embodiments of the disclosure are directed towards the low pressure turbine 24, embodiments of the disclosure are envisioned wherein the active clearance control system is equally applicable to the high pressure turbine 22 embodiments, or a combination of the two embodiments.

Also, as used herein, "sensing" or "measuring" the various temperatures, pressures, or the like can include determining a value indicative of the respective characteristic (e.g. temperature, pressure, etc.) or related to the characteristic, rather than directly sensing or measuring the characteristic itself. The sensed or measured values can be provided to additional components. For instance, the value can be provided to a controller, and the controller can perform processing on the value to determine an estimated or calculated characteristic value representative of the characteristic. Additionally, the design and placement of the various components such as valves, pumps, or ducts, turbines, blades, rotors, and the like can be rearranged such that a number of different in-line configurations could be realized.

The embodiments disclosed herein provide a method and apparatus for operating a clearance control system for a gas turbine engine. The technical effect is that the above described embodiments enable the cooling of the casing to maintain a clearance between the casing and a rotating turbine blade, while ensuring the cooling of the casing prevents casing damage due to rapid thermal expansion or contraction, or prevents the casing from reaching a temperature that exceeds the material capability. One advantage that can be realized in the above embodiments is that the above described embodiments have superior cooling capabilities compared with conventional systems. Another advantage to the above-described embodiments is that by ensuring the casing remains within the material limits for the casing, the failure of the casing can be prevented, or delayed. The prevention of casing failure or damage directly impacts a reduction of maintenance activities, increases the utilization time for the aircraft, and minimizes engine deterioration. Additionally, preventing casing failure or damage, further prevents or reduces the likelihood of further damage to the engine due to, for example, casing damage contacting the engine, or a loss of clearance between the casing and the shroud. Yet another advantage of the above-described embodiments is that maintaining or reducing a clearance between the casing and the blades increases the operating efficiency of the engine, such that the got exhaust gases drive the downstream turbines with minimal exhaust gas leakage. Improving the operating efficiency of the engine reduces fuel consumption, increases the engine performance, and reduces environmentally-harmful emissions, and can increase the fuel range or radius of the aircraft.

To the extent not already described, the different features and structures of the various embodiments can be used in combination with each other as desired. That one feature cannot be illustrated in all of the embodiments is not meant to be construed that it cannot be, but is done for brevity of description. Thus, the various features of the different embodiments can be mixed and matched as desired to form new embodiments, whether or not the new embodiments are expressly described. Moreover, while "a set of" various elements have been described, it will be understood that "a set" can include any number of the respective elements, including only one element. Combinations or permutations of features described herein are covered by this disclosure.

This written description uses examples to disclose embodiments of the invention, including the best mode, and also to enable any person skilled in the art to practice embodiments of the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of operating a clearance control system for a gas turbine engine, comprising:
   estimating, in a control module, a first thermal expansion value of a set of turbine blades in the gas turbine engine based at least partially on an exhaust gas temperature of the gas turbine engine and a first thermal expansion lag factor of the set of turbine blades;
   estimating, in the control module, a second thermal expansion value of a casing concentric to the set of turbine blades based at least partially on the exhaust gas temperature of the gas turbine engine and a second thermal expansion lag factor of the casing;
   determining, in the control module, an estimated clearance value based on the first and second thermal expansion values;
   determining, in the control module, a first airflow value for adjusting a temperature of the casing based on a comparison of the estimated clearance value with a target clearance value;
   determining, in the control module, a second airflow value for adjusting the temperature of the casing based on a comparison of the second thermal expansion value of the casing with a casing limit value; and
   ducting airflow for adjusting the temperature of the casing according to the greater of the first airflow value or the second airflow value.

2. The method of claim 1 wherein estimating at least one of the first thermal expansion value or the second thermal expansion value is at least partially based on an operating phase of the gas turbine engine.

3. The method of claim 2 wherein estimating at least one of the first thermal expansion value or the second thermal expansion value is at least partially based on a start-up engine phase, a steady state engine phase, or a cool down engine phase.

4. The method of claim 1 wherein the determining of the second airflow value includes determining a current temperature of the casing.

5. The method of claim 1 wherein the determining of the first airflow value includes determining a current temperature of the set of turbine blades or a corresponding set of discs.

6. The method of claim 1 wherein the ducting includes controlling a controllable valve to regulate the greater of the first airflow value or the second airflow value.

7. The method of claim 6 wherein the ducting includes sensing at least one of temperature or pressure upstream of the controllable valve, and the controlling the controllable valve regulates at least one of a temperature or pressure downstream of the controllable valve based on at least one of the determined first or second airflow values.

8. The method of claim 6 wherein the ducting includes extracting an airflow from a compressor stage upstream of the controllable valve.

9. The method of claim 1 wherein the determining the second airflow value is based on a comparison of the second thermal expansion value of the casing with at least one of a casing material thermal capabilities value, a casing thermal cracking value, a casing thermal deformation value, a casing thermal deflection value, or a casing thermal failure value.

10. The method of claim 1 further comprising:
   estimating, in the control module, a first mechanical deflection value of a blade in the set of turbine blades due to centrifugal and pressure loading;
   estimating, in the control module, a second mechanical deflection value of the casing due to pressure loads in the gas turbine engine; and
   determining, in the control module, the estimated clearance value based on the first and second thermal expansion values and the first and second mechanical deflection values.

11. A method of operating a clearance control system for a gas turbine engine, comprising:
   in a control module, estimating a clearance profile between a set of turbine blades in the gas turbine engine and a casing concentric to the set of turbine blades, while simultaneously estimating a thermal expansion profile of the casing;
   determining, in the control module, a first airflow profile for adjusting a temperature of the casing based on a comparison of the estimated clearance profile with a target clearance profile;
   determining, in the control module, a second airflow profile for adjusting the temperature of the casing based on a comparison of the estimated thermal expansion profile of the casing and a predetermined thermal expansion profile limit of the casing;
   selecting, in the control module, at least one of the first or the second airflow profiles based on which of the at least first or second airflow profiles results in greater adjusting the temperature of the casing; and
   controlling an airflow for cooling the casing according to the selected at least one of the first or second airflow profiles.

12. The method of claim 11 wherein estimating the thermal expansion profile is at least partially based on an operating phase of the gas turbine engine.

* * * * *